United States Patent [19]

Hovorka

[11] 4,424,739

[45] Jan. 10, 1984

[54] CYLINDER PISTON UNIT

[76] Inventor: Reiner Hovorka, Röttgen 130, 5600 Wuppertal 1, Fed. Rep. of Germany

[21] Appl. No.: 138,904

[22] Filed: Apr. 10, 1980

[30] Foreign Application Priority Data

Apr. 11, 1979 [DE] Fed. Rep. of Germany ....... 2914694

[51] Int. Cl.³ .............................................. F01B 19/00
[52] U.S. Cl. ...................................... 92/105; 92/86.5; 92/153
[58] Field of Search ................. 92/86.5, 105, 153, 156

[56] References Cited

U.S. PATENT DOCUMENTS

| 2,027,979 | 1/1936 | Hopkins | 92/153 |
| 2,191,861 | 2/1940 | Rymal | 92/153 |
| 3,212,447 | 10/1965 | Browne | 92/48 |
| 3,902,404 | 9/1975 | Breit | 92/86 |
| 4,384,510 | 5/1983 | Frey | 92/105 |

FOREIGN PATENT DOCUMENTS 1040065 10/1978 Canada .

Primary Examiner—Abraham Hershkovitz
Attorney, Agent, or Firm—Berman, Aisenberg & Platt

[57] ABSTRACT

Apparatus including an elastomeric hose arranged alternately to stretch longitudinally and then contract in operation of the apparatus, and a contact member disposed so as to be in sliding contact with a surface of the hose during said stretching and/or during said contraction of the hose, a lubricant being supplied between the contact member and the hose to lubricate said sliding contact, wherein the improvement comprises said hose having a longitudinal region which is so clamped or is so disposed that it undergoes little or no stretching and contraction in operation of the apparatus, an axially extending annular gap being disposed between the said contact member and the hose at said longitudinal region, the lubricant being fed to said gap.

5 Claims, 4 Drawing Figures

CYLINDER PISTON UNIT

This invention relates to apparatus including an elastomeric hose arranged alternately to stretch longitudinally and then contract in operation of the apparatus, and a contact member disposed so as to be in sliding contact with a surface of the hose during said stretching and/or during said contraction of the hose, a lubricant being supplied between the contact member and the hose to lubricate said sliding contact.

The apparatus may take the form of a pump. One such pump is described in Canadian Patent Specification No. 1,040,065. In FIGS. 1 to 3 of that specification there is shown a pump in which the hose is mounted within a sleeve or cylinder. One end of the hose is clamped to the cylinder whilst the other end of the hose is connected to a piston which reciprocates in the cylinder. As the hose is stretched and contracted by movement of the piston, its internal volume changes to generate a pumping action, alternately sucking a pressure medium into the hose and ejecting it from the hose. In order to reduce friction between the cylinder and the hose during operation, and in order to dissipate the resulting heat, lubricant is supplied under pressure between the cylinder and hose. The lubricant is supplied through a supply duct into an annular groove at the place where the elastomeric sealing hose is stretched, and is thence distributed in both axial directions around the periphery of the hose.

A disadvantage of this pump is that the pressure medium within the hose always has to be maintained at a constant pressure equal to the pressure of the lubricant supplied through the annular gap. Otherwise, the hose will be greatly constricted and deformed by the pressure of lubricant in each suction phase, at the place where the hose is stretched and has uniform, relatively thin walls. If the pressure of the pressure medium within the hose exceeds the pressure of the lubricant, the higher internal pressure during the pressure stroke will press the hose into the annular lubricant groove and destroy it at that place. This greatly restricts the usefulness of the cylinder-piston unit.

Apparatus according to the invention may also take the form of a boot pump as described in U.S. Pat. No. 2,027,979. The said boot pump comprises a cylindrical plunger disposed within a hose, and as the plunger moves to stretch the hose a pressure medium is ejected from a pressure chamber in part defined by the outer surface of the hose.

In this pump, the sliding contact occurs between the plunger and the inside of the hose, and the plunger is formed with an axial supply duct for lubricant, which duct opens at an end face of the plunger which abuts an end wall of the hose. During prolonged operation of the pump the hose may be damaged at the outlet of the supply duct if lubricant is supplied under pressure and the pressure in the pressure chamber rises appreciably above the lubricant pressure, since the hose is pressed into the supply-duct outlet during each pressure stroke and ejected during each suction stroke, the two processes occurring alternately.

An aim of the invention, therefore, is to provide apparatus of the kind specified in the opening paragraph of this specification having an improved lubrication arrangement. Accordingly, the improvement comprises said hose having a longitudinal region which is so clamped or is so disposed that it undergoes little or no stretching and contraction in operation of the apparatus, an axially extending annular gap being disposed between the said contact member and the hose at said longitudinal region, the lubricant being fed to said gap.

Two embodiments of apparatus according to the invention will now be described by way of example and with reference to the accompanying drawings, in which.

Figure 1:
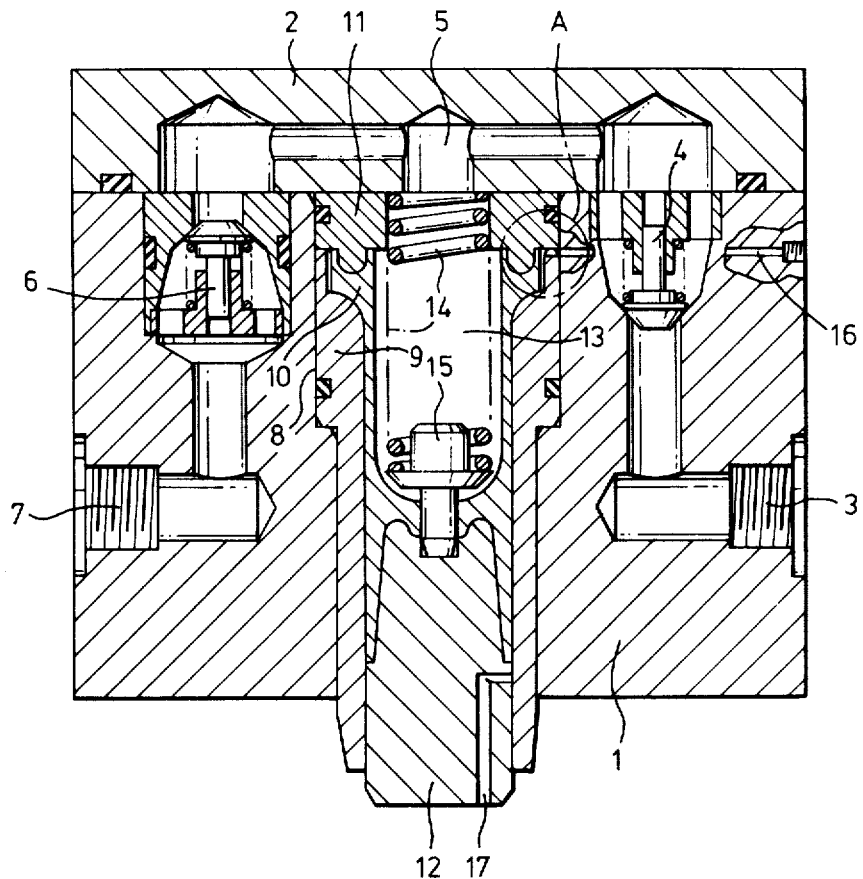
FIG. 1 is a longitudinal sectional view of a pump according to the invention.

FIG. 1 shows a pump comprising a housing 1, a housing cover plate 2, inlet bores 3 by way of which fluid to be pumped enters the pump, an inlet valve 4 which is a one-way valve preventing reverse flow through the inlet bores, a fluid chamber 5 in cover 2, an outlet valve 6 to which pumped fluid flows from chamber 5, the valve 6 being a one-way valve preventing flow to chamber 5, outlet bores 7, and a pump unit inserted in a stepped bore 8 in housing 1. The pump unit includes a cylindrical stepped guide sleeve 9 inserted in the stepped bore 8, the sleeve 9 containing a hose 10 made of elastomeric material and open towards the chamber 5.

Figure 2:
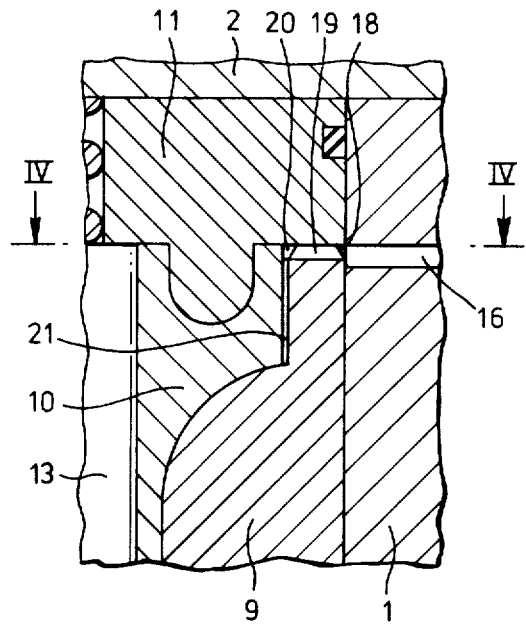
FIG. 2 is a larger-scale view of the portion of FIG. 1 marked A.

The sleeve 9 has a central bore in which is disposed a hose 10 made of an elastomeric material. The upper end region of the bore in the sleeve 9 is widened to accommodate an enlarged diameter flange formed at the end of the hose 10. This flange is, as best seen from FIG. 2, formed in its end face with an annular recess. A retaining ring 11 is clamped between the upper end of the sleeve 9 and the cover 2, the ring 11 having a downwardly projecting annular bead which seats snugly in the annular recess formed in the flange of the hose 10. The upper end of the hose 10, i.e., its flange, is thus firmly retained in place. To assist in retaining the hose flange in place, the flange end face is vulcanised to the retaining ring 11.

Inserted into the lower end of the hose 10 is the end of a piston 12, an end face of the piston abutting an internal wall of the hose 10. The hose 10 is firmly secured to the piston 12 by any suitable means, for example by bonding, and by means of a bolt or pin 15. This member 15 is disposed in a chamber 13 within the hose 10, this chamber being in direct communication with, and forming an extension of, the chamber 5 in the cover 2. The lower end of member 15 passes through the internal wall in the hose and is secured to the piston 12, whilst the upper end of member 15 forms a seat for a compression spring 14. The spring 14 is located in the chamber 13 and acts between the cover 2 and the member 15 to bias the hose 10 and piston 12 downwardly.

In the illustrated position of the pump components, i.e., before the commencement of a suction stroke of the piston 12, the outer surface of the hose 10 engages the internal surface of the sleeve 9. The piston 12 is driven by means not shown to reciprocate within the sleeve 9 so that the hose 10 is alternately stretched and then contracted.

Operation of the pump is as follows:

In order to start the pump, the piston 12 is caused to reciprocate. Starting from its illustrated position, the piston 12 is first moved downwardly causing the hose 10 to be longitudinally stretched. This enlarges the volume of the chamber 13, so that fluid to be pumped is sucked into the chambers 5 and 13 by way of the valve 4, the valve 6 remaining closed. The piston 12 then moves upwardly to reduce the volume of chamber 13 and to pressurise the fluid within it. The one-way valve 4 is thus closed, and fluid is forced out of the chambers 13 and 5 by way of the valve 6 and bores 7. The spring 14 acts in a sense to assist in the stretching movement of the hose, thus reducing the pulling force between the piston 12 and the hose 10 during the suction stroke.

As the hose is stretched and contracted, there is of course sliding friction between the outer suface of the hose and the inner surface of the sleeve 9, and in order to prolong the life of the hose 10, a lubrication system is provided. As best seen from the large scale view of FIG. 2, lubricant is fed to the pump by way of a duct 16 in the housing 1. This duct 16 opens into an outer annular duct 18 formed by a chamfer at the upper outer edge of the sleeve 9. This annular duct 18 communicates with an inner annular duct 20 by way of a number of circumferentially spaced radial grooves 19 in the sleeve 9, this inner duct 20 also being formed by a chamfer on sleeve 9. From the duct 20, the lubricant is fed downwardly into an axially extending annular gap 21 formed between the flange of the hose 10 and the inner surface of sleeve 9. The lubricant flows from the gap 21 downwardly between the hose and sleeve over the entire length and circumference of the hose, the lubricant leaving the pump by way of a duct 17 formed in the piston 12.

It is of importance that the axially extending annular gap 21 is disposed at a longitudinal region of the hose 10 where it is securely clamped and therefore does not stretch to any appreciable extent during operation of the pump.

In an alternative embodiment (not illustrated) the axially extending annular gap 21 could be disposed in the region where the hose is connected to the piston 12, this also being a region where there is little or no stretching of the hose 10 during operation of the pump.

Figure 3:
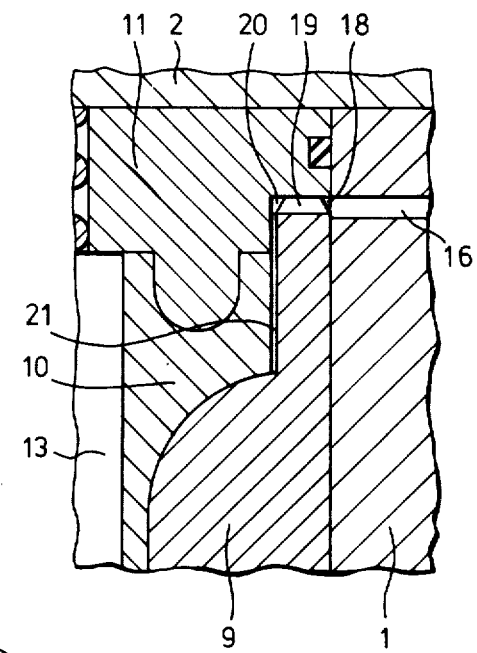
FIG. 3 is a larger-scale view of an alternative embodiment of portion A in FIG. 1.
Figure 4:
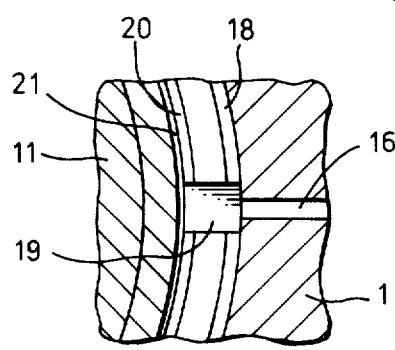
FIG. 4 is a cross-section along the section line in FIG. 2.

FIG. 3 shows an alternative construction in which the upper end of the sleeve 9 is extended beyond the top of the hose 10 instead of terminating level with it, the retaining ring 11 being recessed to receive the projecting end portion of the sleeve 9.

In this case, the axially extending annular gap 21 is contiguous with an upper gap extending beyond the top of the hose, between the sleeve and the retaining ring 11, the lubricant entering gap 21 by way of this upper gap so that the lubricant is already flowing axially before it encounters the hose.

In the embodiments described above, the friction takes place between the outer surface of the hose and a contact member, i.e., a sleeve or cylinder. However, it will be understood that the invention can also be applied to an arrangement where the friction takes place between the inner surface of the hose and an internal contact member, such an arrangement being described in U.S. Patent Specification No. 2,027,979 mentioned above.

The invention completely obviates the disadvantages of supplying lubricant at a place where the hose is stretched, and thus greatly prolongs its life. Furthermore, if the pressure in the chamber 13 alters at high frequency, the lubricant forms a uniform layer along the entire length of the hose 10, and the hose surface uniformly abuts the lubricant. Consequently, the pressure in the chamber 13 of the hose can be varied within wide limits irrespective of the pressure of the supplied lubricant. For example, the hose can be subjected to very high alternating pressure loads by the pressure medium pumped during the rapidly alternating pressure and suction strokes. A relatively low pressure of lubricant is sufficient for this purpose.

I claim:

1. A cylinder-and-piston unit comprising a housing, a cylindrical bore in said housing, a hose-retaining ring in said bore, a sleeve in said bore, an elastomeric hose in said sleeve, a reciprocally-movable piston in said sleeve, connecting means connecting the piston to a first part of said hose whereby reciprocating movement of said piston causes the hose to be alternately stretched and contracted longitudinally, a flange formed externally on a second part of said hose, a correspondingly-shaped recessed part in said sleeve to receive said flange and to clamp the hose flange between said sleeve and said hose-retaining ring whereby the longitudinal region of said hose adjacent said flange undergoes substantially no stretching and contraction during reciprocating movements of said piston, a longitudinally-extending annular gap between said recessed part of said sleeve and said hose adjacent said flange thereon, and a lubricant-supply duct in said housing leading to said gap for the supply of lubricant thereto.

2. A cylinder-and-piston unit as claimed in claim 1, wherein said flange on said hose is formed at one end of said hose.

3. A cylinder-and-piston unit as claimed in claim 1, wherein said hose is vulcanised to said retaining ring.

4. A cylinder-and-piston unit as claimed in claim 1, wherein said longitudinally-extending annular gap between the hose and the sleeve is contiguous with a like longitudinally-extending annular gap defined between the retaining ring and an extension of the sleeve which projects beyond the hose.

5. A cylinder-and-piston unit as claimed in claim 1, wherein internal and external cylindrical walls of said sleeve are chamfered at an end of the sleeve to define inner and outer annular chambers, said chambers being interconnected by radial passages through said sleeve, the said outer annular chamber being connected to said lubricant-supply duct, and the said inner annular chamber communicating directly with said longitudinally-extending annular gap.

* * * * *